United States Patent [19]
Makino et al.

[11] Patent Number: 5,136,447
[45] Date of Patent: Aug. 4, 1992

[54] THIN FILM MAGNETIC HEAD WITH CRYSTALLIZED GLASS SUBSTRATE

[75] Inventors: Kenji Makino, Yokohama; Fujihiro Ito, Tsurugashimacho; Yutaka Kusano; Toru Matsuda, both of Yokohama; Shin'ichi Inoue, Fukaya, all of Japan

[73] Assignee: Canon Kabushiki Kaisha, Tokyo, Japan

[21] Appl. No.: 615,886

[22] Filed: Nov. 20, 1990

[30] Foreign Application Priority Data

Nov. 22, 1989 [JP] Japan .................. 1-306072

[51] Int. Cl.⁵ ............................................. G11B 5/31
[52] U.S. Cl. ................................................ 360/126
[58] Field of Search ................ 360/126, 127; 29/603

[56] References Cited

U.S. PATENT DOCUMENTS

| | | | |
|---|---|---|---|
| 4,816,949 | 3/1989 | Yamada et al. | 360/120 |
| 4,964,007 | 10/1990 | Satomi et al. | 360/120 |
| 5,008,767 | 4/1991 | Iwata et al. | 360/126 |
| 5,057,959 | 10/1991 | Inoue et al. | 360/126 |

Primary Examiner—Robert S. Tupper
Attorney, Agent, or Firm—Spencer, Frank & Schneider

[57] ABSTRACT

A magnetic head having a substrate, a magnetic core means including a magnetic thin film deposited on one surface of the substrate, and a protective plate formed on the magnetic thin layer in a way that the magnetic thin film is interposed between the protective plate and the substrate. At least a portion of the substrate, or of the protective plate or of the both substrate and protective plate is made by crystallized glass. The crystallized glass is obtained by thermally treating glass containing the following oxides on % by weight basis:

$SiO_2$: 42~52%,
ZnO: 5~15%,
$Al_2O_3$: 28~38%,
$TiO_2$: 5~15%,
MgO: no more than 10%,
PbO: no more than 10% and has a Vickers hardness of from 800 to 1,100 $kg/mm^2$.

11 Claims, 2 Drawing Sheets

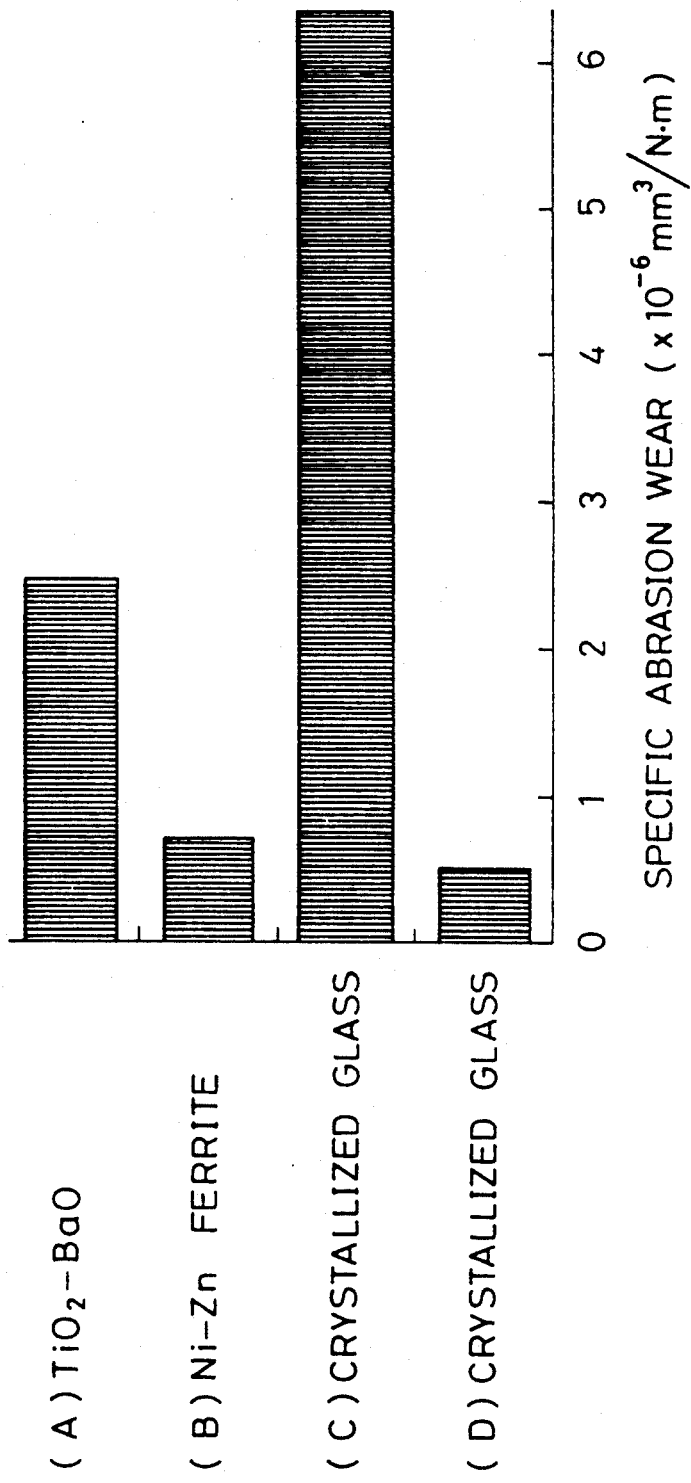

THIN FILM MAGNETIC HEAD WITH CRYSTALLIZED GLASS SUBSTRATE

BACKGROUND OF THE INVENTION

1. Field of the Invention

The present invention relates to a magnetic head and more particularly to a magnetic head including a magnetic core at least a portion of which is constructed by a magnetic then film.

2. Description of the Prior Art

Recently, there has been an increasing demand for magnetic head including a magnetic thin film as a core material, especially magnetic heads having a magnetic core which is formed by a thin film formation technique to a trend that higher recording density is employed in magnetic recording. The above magnetic head hereinafter. Particularly, thin film magnetic heads have already been put on the market for computer external recording units, still video recorders, and the like.

A method usually used for fabricating a thin film head will be explained below. At first, a magnetic material such as Sendust, Permalloy or the like is deposited on a surface of a substrate to form a lower magnetic layer, and then an insulation layer composed of $SiO_2$ or the like is deposited thereon. Subsequently, an electroconductive layer composed of Al or Cu is formed on the insulation layer.

After depositing again an insulation layer composed of $SiO_2$ on the electroconductive layer, magnetic contact holes and a magnetic gap are formed by a photolithographic etching in the second insulation layer. Then, an upper magnetic layer composed of Sendust or the like is deposited on the insulation layer and is formed to have a predetermined shape.

Next, after forming a protective layer or bonding a protective plate on the upper magnetic layer in order to protect the element portion of the resulting chips, the chips are each cut to form a sliding face to complete thin film magnetic head chips.

It is required that the material of the substrate used in the thin magnetic film head thus constructed satisfy the following characteristics and requirements.

(1) The material of the substrate has a coefficient of thermal expansion which approximates the coefficient of thermal expansion of the metallic magnetic material. Mismatching of the coefficient of thermal expansion between the two materials causes the peeling-off of the layers, the deterioration of the magnetic characteristics upon increase in stress, or the curling of the substrate.

(2) The substrate has a small void volume, and its surface is processed to give a mirror surface smooth enough to give substantially no adverse influence on the growth of films.

(3) The substrate has a good processability and scarcely cause failures or cutouts such as chipping upon cutting.

(4) The substrate has a good resistance to abrasion upon the sliding between the substrate and a magnetic recording medium, thus causing no non-uniform abrasion and giving no damage on the magnetic recording medium.

(5) The substrate is available at low cost.

In order to meet the above-described requirements, ferrites and ceramics have heretofore been used as a raw material for the manufacture of substrates, and the substrates composed of such materials are highly reliable. In addition, attention has recently been paid on crystallized glass, which is easy to control its coefficient of thermal expansion and hardness or its particle diameter of crystal grains when manufacturing substrates therefrom.

The substrates manufactured using crystallized glass have a coefficient of thermal expansion larger than that of the substrates made of a ferrite, and therefore it is easier to match the substrates with metallic cores made of a metal or alloy such as Sendust with respect to the coefficient of thermal expansion as compared with the substrates made of a ferrite. Crystallized glass includes crystal grains which are smaller than those of ceramics, so that there seldom occurs chipping upon the processing thereof, or dropping of crystal grains or non-uniform abrasion of crystal grains upon the sliding with magnetic recording media. Furthermore, crystallized glass enables the manufacture of substrates with apertures much larger than those made of ferrites or ceramics, and therefore they are advantageous in reducing cost of head by mass production.

While the substrates made of crystallized glass have various advantages as described above, they have rarely been used practically in actual commercial products because of their low reliability upon the sliding with magnetic recording media. Conventional substrates made of crystallized glass suffer from high abrasion rate, which causes the cohesion of powder formed as a result of abrasion on the substrates. Conversely, the use of substrates made of crystallized glass which is hard and small in abrasion wear causes a problem of non-uniform abrasion that the space between the head gap and the magnetic recording medium increases because the abrasion rate of the magnetic core is higher than that of the substrate. In addition, because the substrate made of crystallized glass is hard, the magnetic recording medium is likely to be damaged.

SUMMARY OF THE INVENTION

In order to overcome the above-described problems, an object of the present invention is to provide a magnetic head which is free of non-uniform abrasion of magnetic core or crystallized glass or of damages on magnetic recording media and which is inexpensive.

In the first aspect of the present invention, a magnetic head comprises a substrate having a surface, a magnetic thin film deposited on the surface of the substrate, and a protective plate arranged on the magnetic thin film in a way that the magnetic thin film is interposed between the substrate and the protective plate, wherein a material of at least a portion of at least one element selected from the group consisting of the substrate and the protective plate is crystallized glass which is obtained by thermally treating glass containing from 42 to 52% by weight of $SiO_2$, from 28 to 38% by weight of $Al_2O_3$, from 5 to 15% by weight of ZnO, from 5 to 15% by weight of $TiO_2$, no more than 10% by weight of MgO and no more than 10% by weight of PbO and which has a Vickers hardness of from 800 to 1,100 kg/mm$^2$.

The magnetic head described above may further include an insulation layer and a coil. The magnetic thin film may be a magnetic metal film, and the insulation layer, which may be composed essentially of an inorganic oxide, insulates the magnetic metal layer and the coil. In this case, the crystallized glass has a coefficient of thermal expansion of from $120 \times 10^{-7}$/°C. to $140 \times 10^{-7}$/°C.

Alternatively, the magnetic head described above may be constructed as follows. That is, the magnetic thin film is a magnetic metal film, the substrate and the protective plate are bonded to each other with an inorganic glass, and the crystallized glass has a coefficient of thermal expansion of from $120 \times 10^{-7}/°C$. to $140 \times 10^{-7}/°C$. In this case, the inorganic glass may be one which has a coefficient of thermal expansion of no more than $120 \times 10^{-7}/°C$.

In the second aspect of the present invention, a magnetic head comprises a substrate having a surface, a first magnetic thin film deposited on the surface of the substrate, an insulation layer arranged in a portion of the first magnetic thin film, a magnetic gap defined in part of the first magnetic thin film, a second magnetic thin film deposited on the first magnetic thin film via the insulation layer and the magnetic gap, and a protective plate bonded to the second magnetic thin film, wherein a material of at least a portion of at least one element selected from the group consisting of the substrate and the protective plate is crystallized glass which is obtained by thermally treating glass containing from 42 to 52% by weight of $SiO_2$, from 28 to 38% be weight of $Al_2O_2$, from 5 to 15% by weight of ZnO, from 5 to 15% by weight of $TiO_2$, no more than 10% by weight of MgO and no more than 10% by weight of PbO and which has a Vickers hardness of from 800 to 1,100 kg/mm².

The magnetic head according to this embodiment may further be constructed as follows. That is, each of the first and second magnetic thin films is a magnetic metal film, the insulation layer is composed essentially of an inorganic oxide, and the crystallized glass has a coefficient of thermal expansion of from $120 \times 10^{-7}/°C$. to $140 \times 10^{-7}/°C$.

The magnetic head may also be constructed as follows. That is, each of the first and second magnetic thin forms is a magnetic metal film, the substrate and the protective plate are bonded to each other with an inorganic glass, and the crystallized glass has a coefficient of thermal expansion of from $120 \times 10^{-7}/°C$. to $140 \times 10^{-7}/°C$. In this case, the inorganic glass may have a coefficient of thermal expansion of nor more than $120 \times 10^{-7}/°C$.

In still another aspect, the present invention provides a first core half including a first substrate having a surface, a plurality of first magnetic thin films deposited on the surface of the first substrate, a first protective plate bonded to the first magnetic thin films, a second core half including a second substrate having a surface, a plurality of second magnetic thin films deposited on the surface of the second substrate, a second protective plate bonded to the second magnetic thin films, and a magnetic gap defined between the first and second core halves, with the first and second core halves being bonded to each other via the magnetic gap; wherein at least a portion of at least one element selected from the group consisting of the first and second substrates, and the first and second protective plates is crystallized glass which is obtained by thermally treating glass containing from 42 to 52% by weight of $SiO_2$, from 28 to 38% by weight of $Al_2O_3$, from 5 to 15% by weight of ZnO, from 5 to 15% by weight of $TiO_2$, no more than 10% by weight of MgO and no more than 10% by weight of PbO and which has a Vickers hardness of from 800 to 1,100 kg/mm².

The magnetic head according to this embodiment may be constructed as follows. That is, each of the first and second magnetic thin films is a magnetic metal film, the first substrate and the first protective plate, and the second substrate and the second protective plate, respectively, are bonded to each other with an inorganic glass, and the crystallized glass has a coefficient of thermal expansion of from $120 \times 10^{-7}/°C$. to $140 \times 10^{-7}/°C$. In this case, the inorganic glass may have a coefficient of thermal expansion of no more than $120 \times 10^{-7}/°C$.

The magnetic head of the present invention satisfies the above described requirements.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 is a graph illustrating the wear characteristics of the crystallized glass substrate constituting the magnetic head illustrated in FIG. 1 and of other materials for substrates.

DETAILED DESCRIPTION OF PREFERRED EMBODIMENTS

Hereafter, an embodiment of the present invention will be described in detail with reference to the attached drawings.

Figure 1:
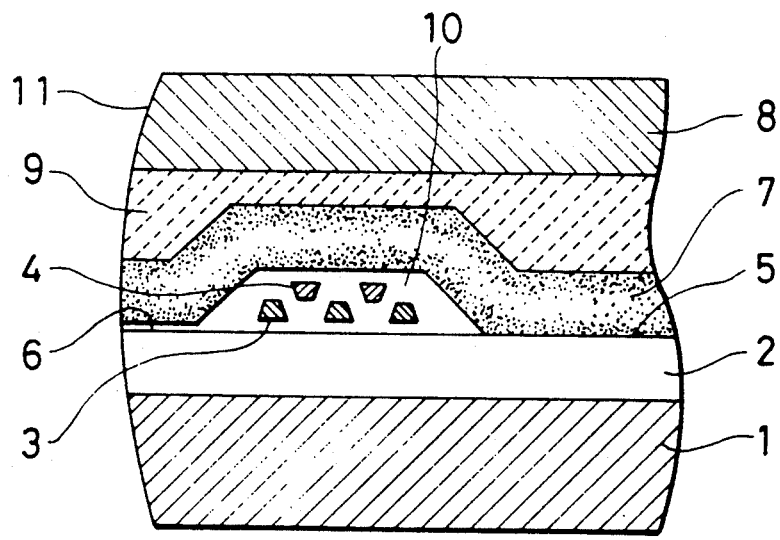
FIG. 1 is a schematic cross sectional view showing one embodiment of a magnetic head according to the present invention.

FIG. 1 is a schematic cross sectional view showing one embodiment of a magnetic head according to the present invention.

In this embodiment, crystallized glass is used as a material for making sliding faces of both a substrate 1 and a protective plate 8, and near portions thereof. Characteristics of the crystallized glass used in the present invention will be explained thereafter.

A film of Sendust included in Fe-Al-Si alloy is formed on the substrate 1 in a thickness of about 10 μm. The Sendust film thus formed is a lower magnetic layer 2 which serves as the first magnetic thin film. On the lower magnetic layer 2 an inorganic oxide such as $SiO_2$ or $Al_2O_2$ is deposited by sputtering. Coils 3 and 4 made of Al, Cu or the like are formed on the deposited layer by photolithography. Thereafter, $SiO_2$, $Al_2O_3$ or the like is again deposited by sputtering on a portion of the lower magnetic layer and on the coils 3 and 4 so that the coils 3 and 4 can be insulated from the lower magnetic layer 2 and an upper magnetic layer described below, thus forming an insulation layer 10. The insulation layer 10 is formed with magnetic contact holes 5 and a magnetic gap 6 by photolithographic etching. An upper magnetic layer 7 made of Sendust or the like and having a thickness of about 10 μm is formed on the magnetic gap 6, the insulation layer 10 and the lower magnetic layer 2. Then, the upper magnetic layer 7 is molded so as to have a predetermined element pattern. In addition, the protective plate 8 made of the same material as the substrate 1 is bonded to the upper magnetic layer 7 by glass bonding with an adhesive 9 at a temperature of from 550° to 650° C. The protective layer 8 is then subject to abrasive lapping to form a sliding face 11, thus obtaining a complete magnetic head. It should be appreciated that the stop of deposition at the step of glass bonding also serves as heat treatment for improving the magnetic characteristics of Sendust.

The crystallized glass substrate is obtained by the heat treatment of glass composed of oxides, i.e., 58% by weight of $SiO_2$, 32% by weight of $Al_2O_3$, 8% by weight of ZnO, 7% by weight of $TiO_2$, 4% by weight of MgO and 1% by weight of PbO, which crystallized glass substrate has a Vickers hardness of about 1,000 kg/mm$^2$.

FIG. 2 shows the results of accelerated abrasion tests against metalcoated tape conducted using the crystallized glass substrate (D) and a comparative crystallized glass substrate (C) which is mainly composed of $Li_2$-$SiO_2$ and has a Vickers hardness of about 700. FIG. 2 also shows the results of such tests obtained using substrates made of NiZn-ferrite (B) and of $TiO_2$-BaO ceramics (A) which have hitherto been commonly employed as a material for substrates or sliders.

It is understood from the test results that the crystallized glass (D) used in the above-described embodiment of the present invention has abrasion characteristics substantially as good as ferrites which have been used practically while the comparative substrate made of the crystallized glass (C) which has a composition different from that of the crystallized glass (D) and a Vickers hardness smaller than the crystallized glass (D) has a greater abrasion wear.

On the other hand, it has been understood that crystallized glass having a Vickers hardness of no less than about 1,100 has a poor processability, resulting in the reduction of yield. The accelerated abrasion tests against metal-coated discs have suggested that the other crystallized glasses (A) and (B) caused the cohesion of abrasion powder or damages on magnetic recording media in contrast to the crystallized glass (D) used in the above-described embodiment of the present invention which gave good results. This confirmed that the crystallized glass substrate of the present invention has good abrasion characteristic and good sliding characteristics.

Furthermore, the magnetic head according to the above-described embodiment of the present invention is constructed to have a thick magnetic layer made of Sendust as thick as about 10 μm so that a sufficient recording depth can be obtained even for longer wavelength signals in order to recording analog video signals in magnetic recording media having a high coercive force. Therefore, it is important to match the coefficient of thermal expansion of Sendust being from $140 \times 10^{-7}/°C$. to $150 \times 10^{-7}/°C$. with the coefficient of thermal expansion of the substrate to be used. In this respect, the magnetic head of the present invention also uses those materials which have a low coefficient of thermal expansion such s $SiO_2$ as an insulation material. As a result, bending or curling of the substrate could occur when depositing the material for the insulation layer if the substrate has too high a coefficient of thermal expansion, which causes disadvantages such s deterioration of the precision of patterning in the photo process.

While glass bonding is performed in the manufacture of the magnetic head according to the above-described embodiment of the present invention, mismatching, if any, of coefficients of thermal expansion of glasses used could cause failures such as cracks. In this case, however, increase in the contents of alkali components of PbO component with view to increasing the coefficient of thermal expansion of the glass for bonding would, contrary to expectation, aggravate the weatherability of the glass. From this point of view, it follows that the coefficient of thermal expansion of the glass for bonding must be $120 \times 10^{-7}$ or less in order to be sufficiently reliable.

Hence, in the above-described embodiment, it is understood that the substrate having a coefficient of thermal expansion being from $120 \times 10^{-7}/°C$. to $140 \times 10^{-7}/°C$., which is lower than the coefficient of thermal expansion of Sendust gave good results.

It was confirmed that the magnetic head constructed as stated above showed substantially no deterioration of its electromagnetic characteristics nor gave damages on magnetic recording media after sliding with the magnetic recording media for no shorter than 1,000 hours, thus being highly reliable.

As for the composition of crystallized glass used in the present invention, in order to obtain realize the above-described optimal ranges of Vickers hardness of from 800 to 1,100 kg/mm$^2$ and of the coefficient of thermal expansion of from $120 \times 10^{-7}/°C$. to $140 \times 10^{-7}/°C$., and to obtain crystallized glass having good weatherability and chemical stability as well as containing fine crystal grains and having good mechanical strength, the composition of the glass to be used must be as set forth below on weight bases:

$SiO_2$: 42~52%,
ZnO: 5~15%,
$Al_2O_3$: 28~38%,
$TiO_2$: 5~15%,
MgO: no more than 10%
PbO: no more than 10%

Figure 3:
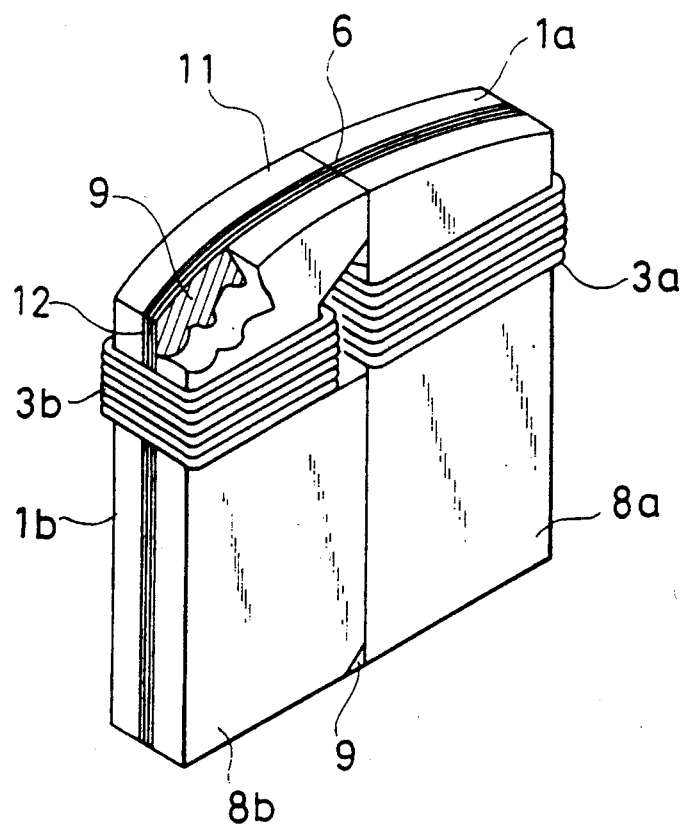
FIG. 3 is a partially cutout perspective view showing another embodiment of the magnetic head according to the present invention.

While in the above-described embodiment so-called thin film type magnetic head which includes coils or the like formed by photolithography as been exemplified, the present invention can also be applied to magnetic heads whose magnetic core is formed by butting laminated magnetic thin films as shown in FIG. 3.

As shown in FIG. 3, according to another embodiment of the present invention, a first substrate 1a and a second substrate 1b, each made of the same crystallized glass a that used in the preceding embodiment, are used, on which a magnetic core 12 made of Sendust is formed by, for example, sputtering. Generally, in this type of magnetic head, its high frequency characteristics tend to be deteriorated due to eddy current when the thickness of the metal core deposited is 10 μm or more. In order to avoid this defect, it is advantageous that the magnetic core 12 be constructed by laminating a plurality of magnetic thin films and interrupting them by inserting therebetween an insulation material such as $SiO_2$ or the like. Thereafter, protective plates 8a and 8b which are made of the same material as the substrates 1a and 1b are formed on the magnetic core 12. Then, the substrate 1a and the protective plate 8a, and the substrate 1b and the protective plate 8b, respectively, are bonded to each other with an adhesive 9 such as glass adhesive to form a pair of chip halves. The chip halves are bonded to each other via a magnetic gap 6 made of $SiO_2$ or the like to obtain a magnetic head chip. After forming a sliding face 11 on the chip, coils 3a and 3b are wound around the respective ship halves to obtain a complete magnetic head chip.

In this embodiment too, the sliding face 11 and portions close thereto are constructed by crystallized glass, and therefore remarkable effects can be obtained by the use of crystallized glass. Furthermore, their coefficient of thermal expansion must be in the range of from $120 \times 10^{-7}/°C$ to $140 \times 10^{-7}/°C$ because the metal core and bonding glass are used in combination.

the two types of the magnetic heads constructed as described above according to the respective embodiments of the present invention have the following advantages.

(1) Excessive abrasion and non-uniform abrasion of the magnetic core as well as non-uniform abrasion of the crystal grains or damages of the magnetic recording media due to the sliding with magnetic recording media can be avoided and thus giving a highly reliable magnetic head.

(2) Crystallized glass substrates are inexpensive.

(3) Further reduction in cost can be achieved by making the diameter of the substrate larger, e.g., as large as no smaller than 4 inches.

(4) A metal core having a high saturated magnetic flux density can be formed in a large thickness, which makes it easy to cope with magnetic recording media with a high coercive force.

The invention has been described in detail with respect to the above-described two embodiments, and it will now be apparent from the foregoing to those skilled in the art that various changes and modifications may be made without departing from the invention in its broader aspects. For example, in contrast to the above-described embodiments where the sliding faces of the both substrate and protective layers and portions in the vicinity thereof are constructed using the specified crystallized glass, only the sliding face of the substrate or the sliding face of the protective plate and portions in the vicinity thereof may be constructed by the specified crystallized glass or all the portions of the both substrates and protective plates may be constructed by the specified crystallized glass. It is the intention, therefore, in the appended claims to cover all such changes and modifications as fall within the true spirit of the invention.

What is claimed is:

1. A magnetic head comprising:
a substrate having a surface,
magnetic core means including a magnetic thin film deposited on the surface of said substrate, and
a protective plate arranged on said magnetic core means in a way that said magnetic thin film is interposed between said substrate and said protective plate,
wherein a material of at least a portion of at least one element selected from the group consisting of said substrate and said protective plate is crystallized glass which is obtained by thermally treating glass containing from 42 to 52% by weight of $SiO_2$, from 28 to 38% by weight of $Al_2O_3$, from 5 to 15% by weight of ZnO, from 5 to 15% by weight of $TiO_2$, no more than 10% by weight of MgO and no more than 10% by weight of PbO and which has a vickers hardness of from 800 to 1,100 kg/mm².

2. The magnetic head as claimed in claim 1, wherein said magnetic core means further includes an insulation layer and a coil, wherein said magnetic thin film is a magnetic metal film, and wherein said insulation layer insulates said magnetic metal layer and said coil, said insulation layer being composed essentially of an inorganic oxide, and wherein said crystallized glass has a coefficient of thermal expansion of from $120 \times 10^{-7}/°C$ to $140 \times 10^{-7}/°C$.

3. The magnetic head as claimed in claim 1, wherein said magnetic thin film is a magnetic metal film, said substrate and said protective plate are bonded to each other with an inorganic glass, and said crystallized glass has a coefficient of thermal expansion of from $120 \times 10^{-7}/°C$ to $140 \times 10^{-7}/°C$.

4. The magnetic head as claimed in claim 3, wherein said inorganic glass has a coefficient of thermal expansion of no more than $120 \times 10^{-7}/°C$.

5. A magnetic head comprising:
a substrate having a surface,
a first magnetic thin film deposited on the surface of said substrate,
an insulation layer arranged on a portion of said first magnetic thin film,
a magnetic gap defined in a part of said first magnetic thin film,
a second magnetic thin film deposited on said first magnetic thin film via said insulation layer and said magnetic gap, and
a protective plate bonded to said second magnetic thin film,
wherein a material of at least a portion of at least one element selected from the group consisting of said substrate and said protective plate is crystallized glass which is obtained by thermally treating glass containing from 42 to 52% by weight of $SiO_2$, from 28 to 38% by weight of $Al_2O_3$, from 5 to 15% by weight of ZnO, from 5 to 15% by weight of $TiO_2$, no more than 10% by weight of MgO and no more than 10% by weight of PbO and which has a Vickers hardness of from 800 to 1,100 kg/mm².

6. The magnetic head as claimed in claim 5, wherein each of said first and second magnetic thin films is a magnetic metal film, said insulation layer is composed essentially of an inorganic oxide, and said crystallized glass has a coefficient of thermal expansion of from $120 \times 10^{-7}/°C$ to $140 \times 10^{-7}/°C$.

7. The magnetic head as claimed in claim 4, wherein each of said first and second magnetic thin films is a magnetic metal film, said substrate and said protective plate are bonded to each other with an inorganic glass, and said crystallized glass has a coefficient of thermal expansion of from $120 \times 10^{-7}/°C$ to $140 \times 10^{-7}/°C$.

8. The magnetic head as claimed in claim 7, wherein said inorganic glass has a coefficient of thermal expansion of no more than $120 \times 10^{-7}/°C$.

9. A magnetic head comprising:
a first core half including
a first substrate having a surface,
first magnetic core means including a plurality of first magnetic thin films deposited on the surface of said first substrate,
a first protective plate bonded to said first magnetic core means,
a second core half including
a second substrate having a surface,
second magnetic core means including a plurality of second magnetic thin films deposited on the surface of said second substrate,
a second protective plate bonded to said second magnetic core means, and
a magnetic gap defined between said first and second core halves, with said first and second core halves being bonded to each other via said magnetic gap;
wherein at least a portion of at least one element selected from the group consisting of said first and second substrates, and said first and second protective plates is crystallized glass which is obtained by thermally treating glass containing from 42 to 52% by weight of $SiO_2$, from 28 to 38% by weight of $Al_2O_3$, from 5 to 15% by weight of ZnO, from 5 to 15% by weight of $TiO_2$, no more than 10% by weight of MgO and no more than 10% by weight of PbO and which has a Vickers hardness of from 800 to 1,100 kg/mm².

10. The magnetic head as claimed in claim 9, wherein each of said first and second magnetic thin films is a magnetic metal film, said first substrate and said first protective plate, and said second substrate and said second protective plate, respectively, are bonded to each other with an inorganic glass, and said crystallized glass has a coefficient of thermal expansion of from $120 \times 10^{-7}/°C.$ to $140 \times 10^{-7}/°C.$ 11. The magnetic head as claimed in claim 10, wherein said inorganic glass has a coefficient of thermal expansion of no more than $120 \times 10^{-7}/°C.$

* * * * *